MAGNETIC FLUX RESPONSIVE SENSING DEVICE

Filed July 22, 1963 3 Sheets-Sheet 1

INVENTOR.
Maurice J. Dunne

BY Mason, Kolehmainen, Rathburn & Wyss

Attys.

MAGNETIC FLUX RESPONSIVE SENSING DEVICE

Filed July 22, 1963 3 Sheets-Sheet 2

INVENTOR.
Maurice J. Dunne
BY Mason Kolehmainen Rathburn & Wyss
Attys.

INVENTOR.
Maurice J. Dunne
BY Mason, Kolehmainen, Rathburn & Wyss
Attys.

3,293,636
MAGNETIC FLUX RESPONSIVE SENSING DEVICE
Maurice J. Dunne, Newtown, Conn., assignor to Unimation, Incorporated, Bethel, Conn., a corporation of Delaware
Filed July 22, 1963, Ser. No. 296,528
18 Claims. (Cl. 340—347)

The present invention relates to magnetic flux responsive sensing devices for sensing the presence or absence of magnetic fields, and, more particularly, to an arrangement which responds only to the presence of a magnetic field of predetermined orientation or polarity.

In many instances it is desirable to provide a sensing device which will respond to the magnetic flux developed by a permanent magnet bit or other localized magnetic fields by producing a unique output signal in response to this magnetic flux. For example, in the control and computer field wherein drum type storage is employed to store information, such as binary command numbers and the like, in the form of magnetic bits which are polarized in accordance with binary code, it is desirable to provide a so-called reading head which will respond to the magnetic flux produced by the individual magnetic bits so that a signal corresponding to a binary "1" or to a binary "0" is produced by this flux responsive read head.

While certain flux responsive heads have heretofore been developed, they have been subject to certain disadvantages. Thus, certain flux responsive read heads have required the use of an alternating current supply for excitation which must be highly regulated both as to frequency and as to voltage. Furthermore, these flux responsive read heads have required a separate source of D.C. bias voltage so that the head will respond only to a particular polarity of magnetic field and this D.C. bias voltage source must usually be regulated also. Furthermore, in A.C. excited read heads, the windings are usually employed in an A.C. bridge type circuit wherein the windings and core elements must be extremely uniform to provide a balance condition representing a binary "0."

With flux responsive read heads of the prior art arrangements, it has also been necessary to maintain the magnetic bit opposite the read head for the entire period during which it is desired to read the binary code number. Accordingly, if such read heads are employed in a drum type system to control movement of a movable member to a plurality of positions in accordance with binary coded command numbers in the form of magnetic bits along the drum, it is necessary to maintain the drum stationary until the movable member has moved to the new position before the drum can be stepped to the next command code number. This means that the movable member come to a complete stop during periods while the drum is being shifted between the respective groups of bits representing successive command numbers.

It is an object, therefore, of the present invention to provide a new and improved magnetic flux responsive sensing device which eliminates one or more of the above described disadvantages of prior art arrangements.

It is another object of the present invention to provide a new and improved magnetic flux responsive sensing device which may be operated from a unidirectional voltage supply and provides an output signal only in response to magnetic fields of predetermined orientation or polarity.

It is a further object of the present invention to provide a new and improved magnetic flux responsive sensing device which is so arranged as to positively provide distinctive output signals representing binary "1" and binary "0" conditions of a series of discrete magnetic fields presented to the sensing device.

It is another object of the present invention to provide a new and improved magnetic flux responsive sensing device which is particularly suited for developing an output signal in response to magnetic fields of extremely low level and of predetermined orientation or polarity.

It is still another object of the present invention to provide a new and improved magnetic flux responsive sensing arrangement wherein the presence of a magnetic field of predetermined polarity can be held or memorized after the magnetic field has been removed from the sensing arrangement so that this information can be used in command number control systems to provide substantially continuous movement of the controlled member.

It is a further object of the present invention to provide a new and improved magnetic field responsive memory device which may be energized by an unregulated unidirectional voltage and provides a signal corresponding to a particular polarity of magnetic field presented to the device during predetermined controllable gating intervals.

It is another object of the present invention to provide a new and improved digital encoding device which employs a magnetic flux responsive sensing device to provide a digital output signal in response to movement of a member along a desired path.

It is still another object of the present invention to provide a new and improved analog-to-digital converting device which is simple in construction economical to manufacture and reliable in its operation to produce an output signal representing movement of a desired member.

Briefly, in accordance with one aspect of the invention, a magnetic coupled oscillator is provided which includes core means having a pair of symmetrically positioned core element and a feedback winding on each of these core elements. These feedback windings are connected in series opposition so that the oscillator is normally prevented from oscillating. However, when an external magnetic field of predetermined orientation is positioned in flux linking relationship to the core elements the flux distribution pattern is arranged so that this external magnetic field aids one of the feedback windings and opposes the other. If the magnetic fiield is of a predetermined polarity it will aid the feedback winding which provides positive feedback with the result that the magnetic coupled oscillator is permitted to oscillate. On the other hand, if the magnetic field is of the opposite polarity it will aid the feedback winding which will bias the oscillator further in a non-conductive direction so that the oscillator is positively prevented from oscillating. In accordance with a further aspect of the invention, a predetermined bias may be established either by employing unbalanced feedback windings or by employing a separate bias winding so that the magnetic field of predetermined polarity which would aid the positive feedback winding must be of sufficient strength to overcome a fixed bias before causing the magnetic coupled oscillator to oscillate.

In accordance with another phase of the invention, a memory arrangement is provided so that the magnetic field sensing device may be employed in a drum readout system. More particularly, facilities are provided for permitting the magnetic flux responsive device to respond to a magnetic field of predetermined polarity only during controllable gating intervals and further facilities are provided for holding the sensed condition of the flux responsive device during periods between these gating intervals.

In accordance with a further aspect of the invention a digital encoding device or analog-to-digital converter arrangement is provided by employing a core of E-shaped configuration for the magnetic coupled oscillator and employing a toothed wheel arrangement in which oppositely polarized teeth are rotated past the outer legs of the E-core in accordance with movements of the member which is to be digitized and the magnetic coupled oscillator is alternately rendered conductive and non-conductive in response to movement of the discrete magnetic fields formed by these polarized teeth so that a digital output signal is provided representing movement of the member.

The invention, both as to its organization and manner of operation, together with further objects and advantages, may best be understood by reference to the following detailed description taken in conjunction with the accompanying drawings in which.

Figure 1:
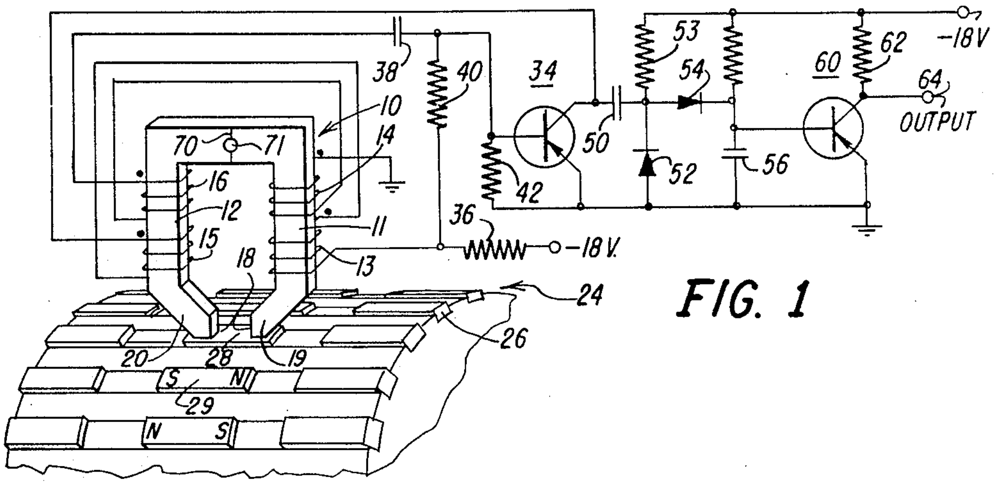
FIG. 1 is a schematic circuit diagram of a magnetic field sensing system embodying certain features of the present invention.

Referring now to FIG. 1, the magnetic flux responsive sensing device of the present invention is therein illustrated as comprising a generally U-shaped core element indicated generally at 10, which is provided with a pair of symmetrically positioned legs or core elements 11 and 12 on which are positioned, respectively, the windings 13, 14 and 15, 16. The bottom ends of the core elements 11 and 12 are spaced apart to provide an air gap 18 and the core 10 is arranged to be positioned so that one or more discrete external magnetic fields may be moved into flux linking relation with the pole tips 19 and 20 of the elements 11 and 12, respectively. To this end, a magnetic drum indicated generally at 24, which may be of non-magnetic material, is provided with a plurality of slots 26 within which are positioned a number of small magnetic elements or bits 28 which are arranged to be moved past the pole tips 19 and 20 as the drum 24 is rotated. These magnetic bits are of high magnetic retentivity and are polarized by any suitable arrangement so that they may represent either a binary "1" or a binary "0." Thus, the magnetic bit 28 is polarized with a north pole adjacent the pole tip 20 and a south pole adjacent the pole tip 19. The next bit 29 which will be moved into flux linking relationship with the pole tips 19 and 20 as the drum 24 is rotated is oppositely polarized so that the north pole will be positioned adjacent the pole tip 19 and the south pole adjacent the pole tip 20. It will be understood that a number of core elements, such as the core 10, may be provided along the length of the drum 24, one for each of the rows of magnetic bits so that all of the bits in a particular groove, such as the groove 26 may be read simultaneously to provide an output signal representing a command number in any suitable numerical system such as binary code, as will be readily understood by those skilled in the art.

The windings on the core 10 are interconnected in a transistor circuit arrangement which is similar in some respects to a conventional magnetic coupled oscillator. However, in accordance with an important feature of the invention, two feedback windings are provided which are connected in series opposition and are symmetrically balanced so that in the absence of any external magnetic field the magnetic coupled oscillator is prevented from oscillating. More particularly, a transistor indicated generally at 34, which in the illustrated embodiment may be of the P-N-P type, is provided with its emitter connected to ground and its collector connected to the upper end of the winding 15. The lower end of the winding 15 is connected to the upper end of the winding 13 and the bottom end of the winding 13 is connected through a resistor 36 to a −18 volt supply.

The windings 14 and 1 comprise the feedback windings of the magnetic coupled oscillator and the upper end of the winding 14 is connected to ground. The bottom end of the winding 14 is connected to the bottom end of the winding 16 and the upper end of this winding is connected through a decoupling capacitor 38 to the base of the transistor 34. A bleeder network comprising the resistors 40 and 42 is connected from the resistor 36 to ground and the junction between the resistors 40 and 42 is connected to the base of the transistor 34. The values of the resistors 40 and 42 are so chosen that the transistor 34 is normally biased to the cutoff region so that a slight change in voltage on the base of this transistor in the proper direction will start the circuit oscillating. The bias network 40, 42 is arranged to provide compensation for varying operating temperature since the leakage current drawn by the transistor 34 varies with temperature and would tend to change the point at which the transistor 34 is biased, as will be readily understood by those skilled in the art. With the biasing arrangement of FIG. 1, as the leakage current increases the drop across the resistor 36 increases correspondingly and reduces the biasing voltage provided on the base of the transistor 34.

Considering now the operation of the magnetic flux responsive device of FIG. 1, the collector windings 13 and 15 are wound with an equal number of turns and as shown in FIG. 1, these windings are wound so as to produce fluxes of equal magnitude in the opposite direction through the feedback coils 14 and 16. The feedback coils 14 and 16 are both wound with the same number of turns although the number of turns in the feedback windings 14, 16 is usually less than the number of turns in the collector windings 13, 15. Accordingly, in the absence of an external magnetic field, the voltages induced in the feedback windings 14, 16 due to leakage current flow through the collector windings 13, 15 are balanced out, due to the fact that the windings 14, 16 are connected in series opposition, so that no net voltage is applied to the base of the transistor 34 in the correct direction to provide the positive feedback necessary to produce oscillations in this transistor. When a magnetic bit, such as the bit 28, is moved into proximity with the pole tips 19, 20, this external magnetic field produces a flux which is superimposed upon the fluxes produced by the collector windings 13, 15 and this flux due to the external magnetic field 28 flows upwardly in the leg 12 and downwardly in the leg 11 of the core 10. This change in the flux distribution pattern in the core 10 is such that the flux upward in the leg 12 is in the same direction as the flux due to the collector winding 15 so that the feedback winding 16 is more highly saturated and becomes in effect therefore a coil of a fewer number of turns. On the other hand, the flux due to the magnet 28 is in opposition to the flux due to the collector winding 13 in the leg 11 so that this leg is not as highly saturated and the feedback winding 14, having a less saturated core, provides a larger output voltage. Under these conditions the voltage developed by the feedback coil 14 predominates over the feedback coil 16. As will be observed from FIG. 1, the dot convention shows in this figure that when collector current flows into the dot end of the collector winding 15 it also flows into the dot end of the collector winding 13 so that transformer action causes an induced current to flow out of the dot in the feedback winding 14. Accordingly, when the feedback coil 14 predominates current will flow from the base of the transistor 34 to ground, i.e., the dot end of the feedback coil 14, so that a positive feedback is provided which will result in an increase in collector current drawn by the transistor 34. This increase in collector current will provide additional feedback voltage which will tend to drive the transistor 34 in the direction of increasing collector current. This action will continue until the voltage available begins to charge up the magnetic material of the core 10 and current has flowed long enough to reach saturation. When this occurs there is no longer any appreciable feedback voltage. However, when the feedback voltage collapses the distributive capacity of the windings on the core 10 has been charged and reverses polarity so as to drive the transistor 34 beyond cutoff and, at the same time, pushes the core 10 back down to its original saturation level. When the energy stored in the distributive capacitance of the windings is dissipated the transistor 34 again turns on so that a continuous oscillation is produced in the transistor. Preferably the material of the core 10 is of the square hysteresis loop variety so that an essentially square wave oscillation will be produced at the collector of the transistor 34 when the magnetic bit 28 is moved into proximity with the gap 18 of the core 10. It will be noted that the collector windings 13, 15 are so arranged that the flow of transistor leakage current through these windings produces oppositely directed fluxes in the legs of the core 10 which tend to cancel. Thus, flow of leakage current in the windings 13, 15 produces upwardly directed fluxes in both of the legs 11 and 12 so that no net flux is present which would be equivalent to that produced when an external magnetic field is moved near the pole pieces 19, 20. This means that a low level magnetic field may unbalance the flux pattern in the core 10 by an amount sufficient to start oscillation. Also, changes in the magnitude of the transistor leakage current do not affect the strength of external magnetic field required to start oscillation since the collector fluxes cancel each other. Also, transients produced when the equipment is turned on or when power is applied and removed from the transistor 34 do not cause oscillations to start since the fluxes developed by these transients are balanced and produce no net magnetomotive force which could aid the winding 14 and cause oscillations to start.

In the illustrated embodiment, the oscillations produced by the transistor 34 in the manner described above, are coupled through a capacitor 50 and a diode 52 is employed to clamp the square wave signal transmitted through the capacitor 50 to the common ground point, a resistor 53 being connected from the rectifier 52 to the −18 volt supply to insure good clamping action for the diode 52. A series rectifier 54 and filter capacitor 56 cooperate to provide a rectified output voltage approximately equal to the peak value of the square wave signal produced by the oscillator 34. This D.C. output signal is applied to the base electrode of an output transistor 60, the emitter of which is connected to ground and the collector of which is connected through a load resistor 62 to the −18 volt supply. The transistor 60 is normally conducting but when a rectified positive voltage is produced across the capacitor 56 the transistor 60 is turned off and the collector potential becomes more negative. A negative signal is thus produced at the output terminal 64 during periods when the oscillator 34 is permitted to oscillate in the manner described in detail heretofore.

Considering now the situation when a magnetic bit of the opposite polarity, such as the magnetic bit 29, is moved into proximity with the pole tips 19, 20, in this case the magnetic field produced by the bit 29 causes a magnetic flux which flows upwardly in the leg 11 and downwardly in the leg 12. Accordingly, in the leg 11 the flux due to the magnetic bit 29 aids the flux produced by the collector winding 13 so that the feedback winding 14 is saturated and has an effective small number of turns. On the other hand, the flow of flux downwardly in the leg 12 opposes the flux developed by the collector winding 15 so that the feedback winding 16 is not as highly saturated and hence this winding predominates. When the feedback winding 16 predominates, the net voltage between the base electrode of the transistor 34 and ground is of the opposite polarity. However, this voltage is such as to bias the transistor 34 more highly negative and hence positively prevents this transistor from oscillating. It will be noted that the bit 29, which represents a binary digit of "0," causes a flux which aids the winding 16 and thus provides an additional bias which positively prevents the transistor 34 from oscillating. Thus, the arrangement of FIG. 1 responds to a field of undesired polarity by positively holding the transistor off rather than merely not responding to this field at all.

It will be understood that the level of the magnetic field established by the small magnetic bits 28, 29, etc. is extremely low and hence it is necessary to provide an arrangement in which the flux densities in the legs 11, 12 are exactly balanced in the absence of an external magnetic field so that the transistor 34 does not oscillate, while, at the same time, permitting only a very slight unbalance in the flux pattern due to a low level external magnetic field to cause the transistor 34 to oscillate. In order to provide for this balanced symmetrical condition of the core legs 11, 12, and in accordance with a further feature of the invention, the core 10 is physically constructed of two identical half sections the laminations of which are jointed together by a butt joint 70 in the upper crossbar portion of the core 10. A central opening 71 at the butt joint 70 is provided for accurately locating the laminations of the core 10 in a supporting structure, as will be described in more detail hereinafter. By providing the butt joint 70, a small air gap of one-half to one mil thickness is provided between the two symmetrical leg portions 11, 12 of the core 10 and the flux densities in these leg portions are balanced because the magnetic center or line of symmetry of the core structure is made to coincide with the physical line of symmetry of this structure. Accordingly, with the provision of the butt joint 70, the core halves may be slightly non-uniform, due to stamping techniques and other factors, and still provide a substantially balanced magnetic flux density pattern for the feedback windings 14 and 16 so that the transistor 34 may be biased very close to the point at which oscillations will start and will respond to a very low level magnetic field presented by a magnetic bit of the proper polarity, as described heretofore. It will, of course, be understood that the external magnetic field provided by the magnetic bit must traverse the butt joint air gap 70 and to this extent the sensitivity of the device to a low level magnetic field is reduced. If desired, the butt joint 70 can be eliminated if extreme care is used in cutting the laminations of the core 10 to exact symmetry and selecting balanced windings on this core structure so that an exactly balanced condition of the feedback windings 14, 16 is provided in the absence of an external magnetic field. The advantage of the butt joint 70 lies in the fact that with this joint production runs of laminations and winding tolerances can be employed, while providing a relatively sensitive device which responds only to low level magnetic fields of one polarity. In this connection it will be noted that the device of FIG. 1 requires no alternating current source of any kind, but instead requires only the −18 volt supply which need not be highly regulated.

Figure 2:
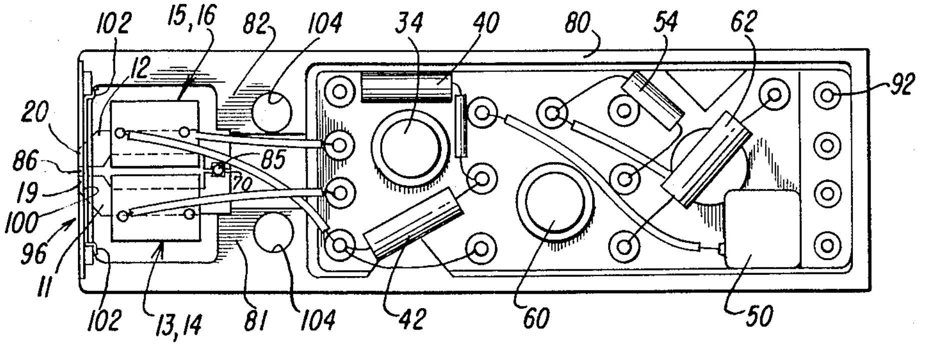
FIG. 2 is a top plan view of a magnetic field sensing device suitable for use in the system of FIG. 1.
Figure 3:
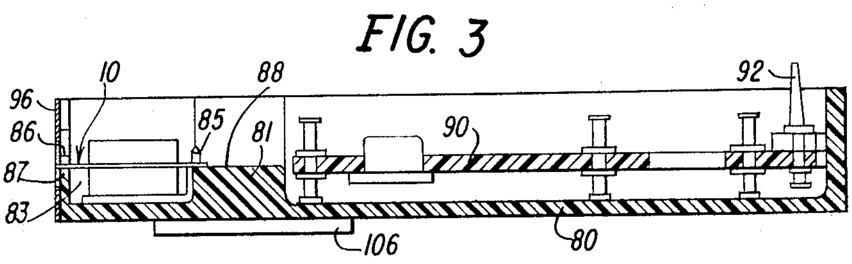
FIG. 3 is a front sectional view taken along the center line of the device of FIG. 2.
Figure 4:
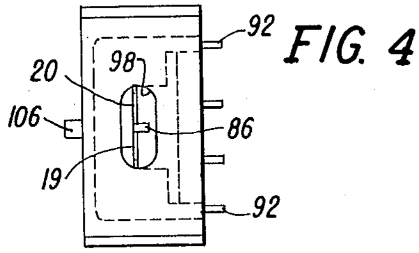
FIG. 4 is a left end view of the device of FIG. 2.

In FIGS. 2 to 4, inclusive, there is shown a physical embodiment of the field responsive sensing device of FIG. 1 incorporated in a practical reading head structure. Referring to these figures, a plastic case or housing 80 is provided having a pair of inwardly extending bosses 81 and 82 which define a recess 83 at one end of the housing 80 which is adapted to receive the core structure 10 and the windings 13, 14 and 15, 16 on the legs 11 and 12 thereof, respectively. A locating pin 85 is employed to center or locate one end of the core sections 11, 12 so as to provide the above described butt joint 70 between one end of these laminations, and a small lug 86 is formed in the upper edge of the front wall 87 of the housing 80 to center the pole tip portions 19 and 20 of the core elements 11 and 12, it being understood that these laminations rest on the upper surface of a bridging portion 88 between the bosses 81, 82 at one end thereof and on the upper edge of the front wall 87 at the other end thereof. In this connection it is noted that the butt joint 70 in FIG. 2 will in actual practice provide an air gap of one-half mil to one mil thickness although this gap is shown somewhat larger in FIG. 2. The connections to the coils 13, 14, 15 and 16 are led through the groove formed by the bridge portion 88 to a component mounting board 90 which is positioned in the housing 80 and is connected to a series of external terminals 92 which extend above the upper edge of the housing 80. The components described heretofore in connection with FIG. 1 are mounted on the terminal board 90 and corresponding reference numerals have been given these components in FIGS. 2 to 4, inclusive.

In order that the magnetic field sensing device will respond only to a desired magnetic bit of relatively small dimensions and will not be affected by stray magnetic fields, a shunting plate indicated generally at 96 is secured to the end of the housing 80 and is provided with an elongated opening 98 therein through which the pole tip portions 19, 20 can extend. The shunting plate 96 is preferably made of mu-metal or other magnetic shielding material and is secured in place by means of a clamping member 100 which is secured to the shunting plate 96 by any suitable means such as welding and is provided with a pair of ear portions 102 which may be bent around the side wall 87 to hold the plate 96 in place. After the components described have been assembled in the housing 80, the entire housing is filled with a suitable potting compound, such as an epoxy resin or the like, and this compound will seal all of the components within the housing 80, this compound also surrounding the pole tip portions 19, 20 within the opening 98 in the shunting plate 96 so that a smooth surface is provided for the sensing end of the housing 80. A pair of mounting holes 104 are provided in the housing 80 and a locating pin 106 is provided on the bottom surface thereof so that the sensing unit may be accurately located in a suitable reading head structure for cooperation with a drum or other type of carrier of magnetic field information. By providing the shunting plate 96 the reading heads may be positioned close to one another without responding to the adjacent row of magnetic bits. Thus, if a magnetic bit is positioned under the plate 96 but is not within the opening 98 in this plate the magnetic field of this bit will be shunted by the plate 96 and will not reach the pole tips 19, 20.

Figures 5, 6, 8:
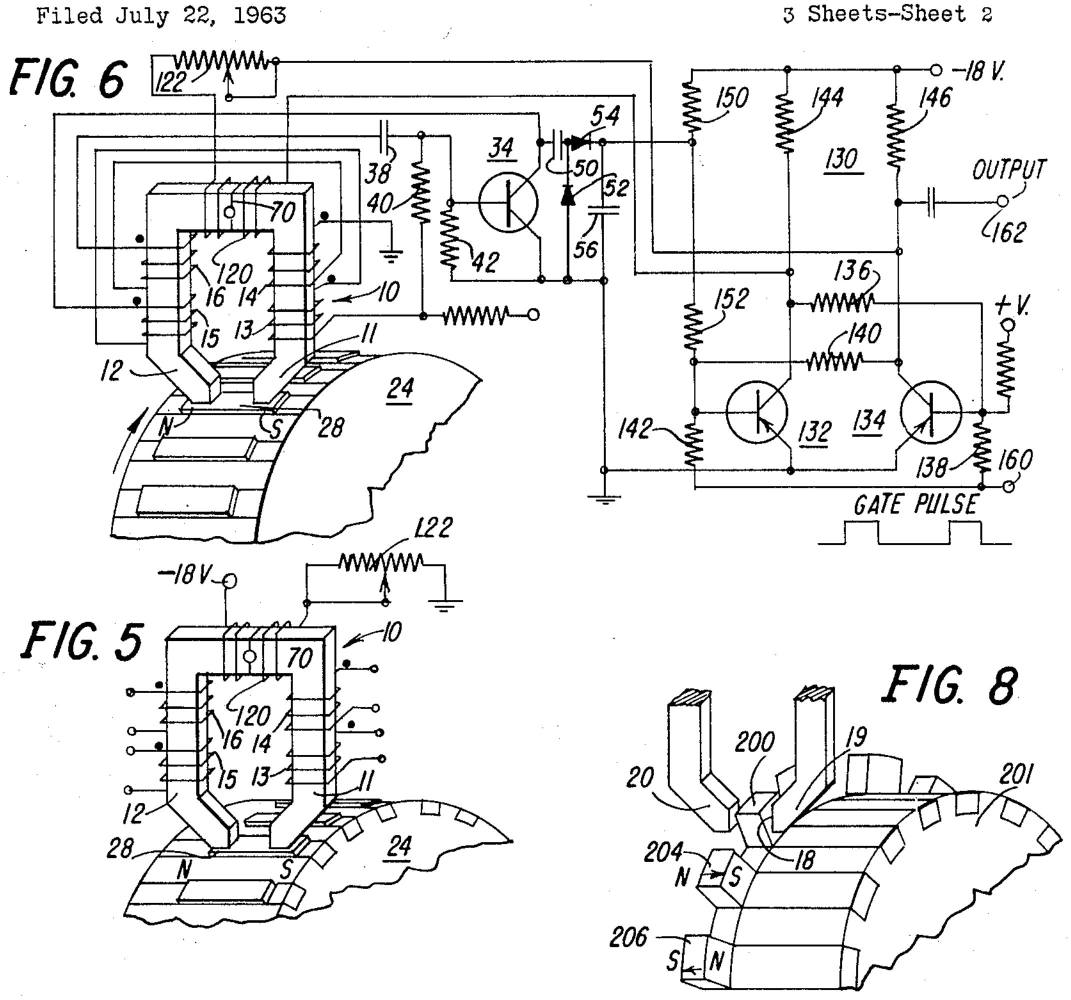
FIG. 5 is a schematic diagram of an alternative form of a magnetic field sensing device.
FIG. 6 is a schematic diagram of a magnetic field responsive memory arrangement according to the present invention wherein the sensed condition of the magnetic field may be retained and utilized.
FIG. 8 is a fragmentary diagrammatic view of an alternative embodiment of the invention.

In the magnetic field sensing device of FIG. 1, the feedback windings 14, 16 are exactly balanced so that a low level magnetic field of the proper polarity can unbalance these windings in the correct direction to cause the transistor 34 to oscillate. In accordance with a further feature of the invention, an arrangement can be provided so that the oscillator 34 will not oscillate unless the external field of the proper polarity is also of a predetermined field strength. To this end, an additional bias winding 120 is provided on the crossbar portion of the core structure 10, as shown in FIG. 5. One end of the bias winding 120 is connected to the −18 volt supply and the other end of this winding is connected through a potentiometer 122 to ground. In the embodiment of FIG. 5 the bias winding 120 is so wound that current flow through this winding creates a magnetic field which opposes an external magnetic field of the correct polarity to cause oscillation. Thus, flux due to flow of current in the bias winding 120 will be upward in the leg portion 11 and downward in the leg portion 12 so that without any external magnetic field present the feedback winding 16 will predominate and will keep the transistor 34 from oscillating. When an external magnetic field of sufficient strength and of a polarity the same as the magnetic bit 28 is positioned adjacent the pole portions 19, 20 the flux bias produced by the winding 120 is overcome by an amount sufficient to cause the feedback winding 14 to predominate and since this winding is of the correct polarity to provide positive feedback oscillations will be produced in the transistor 34 in response to this external magnetic field of predetermined magnitude. It will also be noted that the potentiometer 122 may be adjusted to vary the field strength level at which the transistor 34 will respond so that adjustment for different magnetic field strengths is provided. In this connection it is also noted that in the embodiment of FIG. 5 wherein the bias winding 120 is employed it is no longer necessary to provide an exact balance between the feedback windings 14, 16 and hence the butt joint 70 may be eliminated if it is desired, since the bias winding 120 itself provides an unsymmetrical flux distribution in the two legs 11, 12 of the core 10. An unsymmetrical flux distribution in the legs 11, 12 may also be obtained by forming the legs 11, 12 with unequal cross-sectional areas or by winding the collector windings 13, 15 with an unequal number of turns. The feedback windings 14, 16 may also be unequal to provide the desired condition in which the external magnetic field must be of predetermined strength in order to cause the transistor 34 to oscillate. An arrangement in which an unsymmetrical flux pattern is established in the core 10 is of particular importance in situations where the external magnetic fields represent digital or numerical information. This is because the magnetic bits must necessarily be spaced apart physically and during the period when no magnetic bit is adjacent the core the production of an output response, due to a stray magnetic field or the like, would cause a random output signal which is called an ambiguity in digital terminology. However, with an unbalanced flux pattern tending to hold the transistor 34 off in the absence of an external field the output of the device is always binary "0" and the circuitry following the sensing device may be designed on the basis that no ambiguities are present which simplifies this design considerably. Of course, when the flux densities in the core legs 11, 12 are unequal in the direction tending to hold the transistor 34 off the external magnetic field of the desired polarity must have sufficient strength to overcome this unbalance and also unbalance the flux distribution in the opposite direction to aid the winding 14 by an amount sufficient to start oscillations.

In certain instances it is desirable to provide an arrangement in which the sensing device can be controlled so that it will only sense the presence and polarity of a magnetic field during a predetermined gating interval and will hold the sensed information until the next gating interval. For example, when the magnetic field sensing device is employed in connection with a drum type unit such as the drum 24 to read out a group of bits representing a command number in binary form, it is desirable to retain or memorize the polarities of the magnetic bits in any particular one of the grooves 26 of this drum so that the drum may be stepped to bring the next groove into alignment with the series of magnetic field sensing devices while the controlled member is being moved to the position indicated by the memorized command number. In FIG. 6 an arrangement is shown wherein the magnetic field sensing device of the present invention is provided with facilities for controlling the periods during which the device is permitted to sense the presence and polarity of an external magnetic field and further facilities are provided for retaining the sensed information until the next controlled gate interval. Referring to this figure, a flip-flop circuit indicated generally at 130 is provided which comprises the transistor stages 132 and 134. The collector of the transistor 132 is cross connected to the base electrode of the transistor 134 by means of the voltage divider network 136, 138 and the collector of the transistor 134 is cross connected to the base electrode of the transistor 132 by means of the network 140, 142 so that a conventional flip-flop circuit is provided. The emitters of the transistors 132 and 134 are connected to ground and the collectors of these transistors are connected through the respective load resistors 144 and 146 to the −18 volt supply. The flip-flop circuit 130 is arranged so that the stage 132 thereof is normally conducting. To this end, the resistors 150 and 152 are connected from the −18 volt supply to the base of the transistor 132 so as to bias this transistor to the conductive state.

The magnetic field sensing portion of the arrangement of FIG. 6 is similar to that shown in FIG. 5 wherein the bias winding 120 is provided on the core 10. However, in the arrangement of FIG. 6 the bias winding 120 is not energized by a fixed current but instead is connected so that current will flow through this bias winding in either direction depending upon the conductive state of the flip-flop circuit 130. Thus, one end of the bias winding 120 is connected to the collector of the transistor 132 and the other end of this winding is connected through the potentiometer 122 to the collector of the transistor 134. The oscillatory output of the transistor 34 is supplied through the condenser 50 to the filter network including the rectifier 54 and condenser 56. However, the rectified output produced at the junction of the elements 54, 56 is connected to the junction of the resistors 150 and 152 in the biasing circuit of the flip-flop transistor 132. The flip-flop circuit 130 is also arranged so that in addition to its two normal setting conditions in which either the stage 132 is conducting or the stage 134 is conducting, this circuit is arranged so that it can be set by an external gating pulse so that both stages are non-conducting. More particularly, a large positive gating pulse applied to the terminal 160 is supplied through the resistors 138 and 142 to the base electrodes of the transistors 134 and 132 respectively, so that both of these transistors are rendered non-conductive irrespective of the other bias potentials on the flip-flop stages for the period of this positive gating pulse.

Considering now the operation of the magnetic field memory arrangement of FIG. 6, during the period when a positive gating pulse is supplied to the terminal 160, both of the transistor stages 132 and 134 of the flip-flop circuit 130 are rendered non-conductive so that the collectors of these transistors are at the same potential and no current flows in the bias winding 120. Under these conditions the flux pattern in the core 10 is identical to that described in detail heretofore in connection with the embodiment of FIG. 1. If a magnetic bit of the wrong polarity, such as the bit 29 in FIG. 1, is presented to the pole pieces 19, 20 the winding 16 will predominate and, as described heretofore in connection with the arrangement of FIG. 1, the transistor 34 will be prevented from oscillating. However, in the presence of a low level magnetic field of the proper polarity, such as the magnetic bit 28 in FIG. 1, oscillations will be produced in the transistor 34 in the manner described in detail heretofore. These oscillations are rectified in the filter network 54, 56 so as to provide a positive voltage across the condenser 56 which overcomes the negative bias normally provided by connection of the resistor 150 to the −18 volt supply. Accordingly, when the positive gating pulse disappears at the terminal 160 and conventional flip-flop action is resumed, a positive bias is applied to the base of the transistor 132 so that this transistor is rendered non-conductive and the flip-flop 130 is set to the condition in which the transistor 134 is rendered conductive. When the transistor 134 is conductive and the transistor 132 is non-conductive, current flows through the bias winding 120 in such direction that flux due to this current flow is downward in the leg 11 and aids the feedback winding 14 so that this feedback winding predominates and maintains the transistor 34 in an oscillatory state. Furthermore, the current flow through the bias winding 120 is made sufficiently great that the flux produced thereby, which assists the winding 14, will maintain the transistor 34 oscillating after an external magnetic field is removed and even though external magnetic fields of the opposite polarity, such as the bit 29, are presented to the pole tip portions 19, 20. Accordingly, if an external magnetic field of the correct polarity is presented to the sensing device during the positive gating pulse interval, the circuit of FIG. 6 is arranged so that the transistor 34 continues to oscillate after the field is removed and until the next gating pulse interval. During this period the output signal derived from the collector of the transistor 134 will have a positive value.

If, on the other hand, no external magnetic field of the correct polarity is presented to the sensing device during the positive gating pulse interval, when this gating pulse disappears the negative bias provided by the resistor 150 functions to render the transistor stage 132 conductive so that the flip-flop 130 is set to the condition in which the transistor 132 is conductive and the transistor 134 is non-conductive. The output signal produced at the collector of the transistor 134 then has a negative value since the transistor 134 is turned off. Under these conditions, current flows in the opposite direction through the bias winding 120, and produces a flux which is downward in the leg 12 and assists the feedback winding 16. This bias condition exists until the next gating pulse interval and the strength of the flux developed by the bias winding 120 is sufficiently great that the feedback winding 16 will predominate and keep the transistor 34 from oscillating even though an external magnetic field of the correct polarity, such as the bit 28 in FIG. 1, is presented to the pole tips 19, 20 during this interval. In other words, the bias winding 120 is arranged to provide a bias magnetomotive force slightly more than twice as great as any one of the external magnetic fields produced by the magnetic bits 28, 29, etc.

It will be seen from the above that the arrangement of FIG. 6 responds during the positive gating pulse interval by producing a positive output at the output terminal 162 if an external magnetic field of the proper polarity is presented to the sensing device during this gating pulse interval and this positive output condition exists at the terminal 162 until the next gating pulse interval. On the other hand, if no external magnetic field of the proper polarity is presented to the sensing device during the positive gating pulse interval, a negative output is produced at the output terminal 162 and this negative output condition persists until the next gating pulse interval. During the periods between gating pulses the device does not respond to magnetic fields of either polarity. The presence and polarity of the sensed magnetic field are thus retained or preserved from one gating pulse interval to another by the arrangement of FIG. 6. It will be understood that a number of circuits similar to FIG. 6 may be employed one for each digit (i.e., magnetic bit) of the numerical information contained in one of the grooves or lines along the length of the drum 24. These circuits may all be controlled by a common source of gating pulses applied to the terminal 160 of each circuit. It will thus be evident that by timing the occurrence of the gating pulse supplied to the terminals 160 in relation to a particular line of numerical information on the drum 24, the arrangement of FIG. 6 may be employed to read any particular line on the drum and retain the information contained therein in usuable form. The lines of numerical information on the drum may thus be read in any order by control of the timing of the gating pulses and one is not limited to the physical sequence of these lines as the drum is rotated. Such control over the timing of the gating pulses may be effected by any suitable means which is synchronized with drum movement, as will be readily understood by those skilled in the art. An external control over the particular line of information which is to be read from the drum is thus provided. At the same time, the information which is read from the drum at a particular line thereon is retained in the flip-flop circuits 130 until the next gating pulse interval so that this information can be utilized in any desired manner while permitting movement of the drum to the next readout position.

Figures 7, 7A:
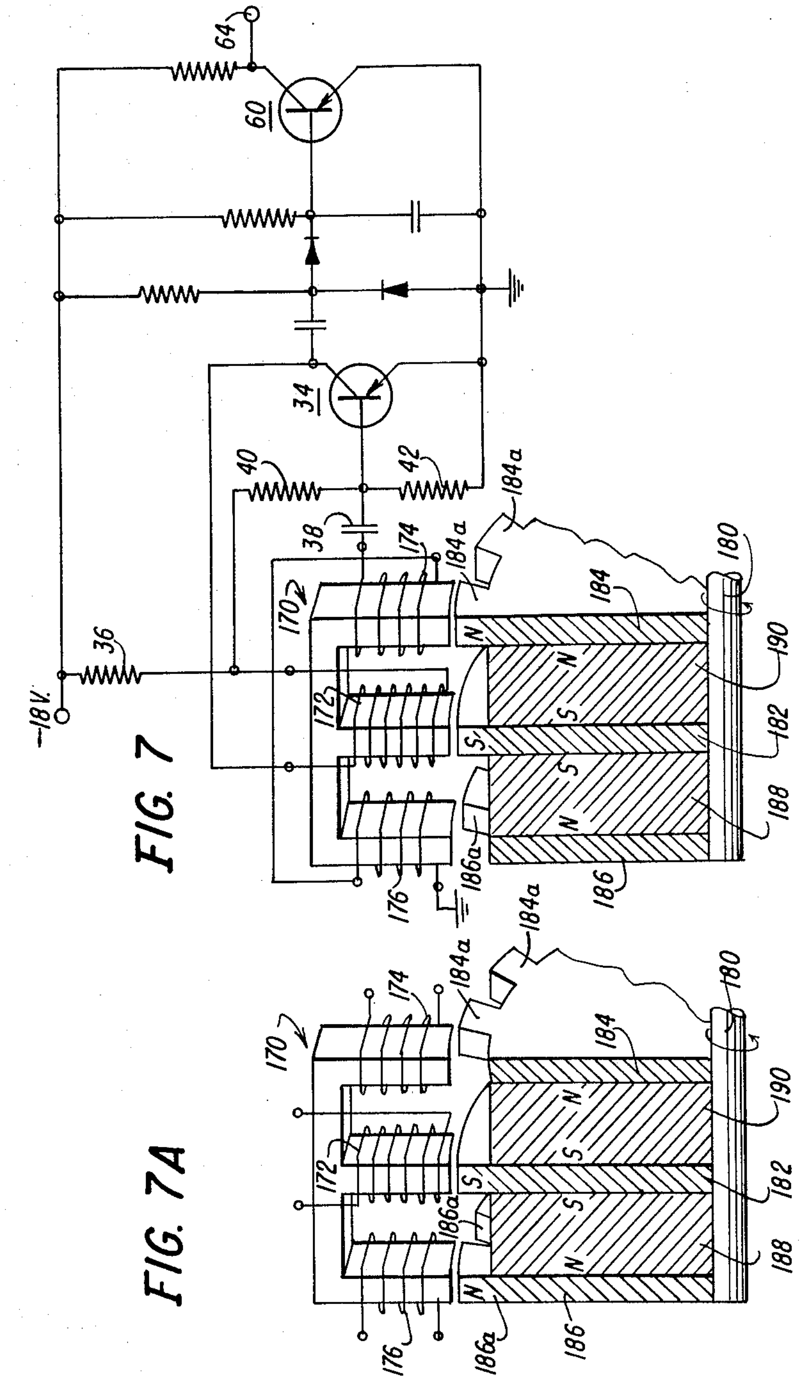
FIG. 7 is a schematic diagram of a digital encoding arrangement according to the present invention.
FIG. 7A is a fragmentary schematic diagram similar to FIG. 7 but showing the input shaft of the device in a different position.

The magnetic field sensing arrangement of FIG. 1 can also be employed in an analog-to-digital converter arrangement so as to provide a digitized electrical signal representing analog movement of a desired member. Such an arrangement is shown in FIG. 7 wherein a somewhat different core structure is employed for the magnetic sensing device. Thus, referring to this figure, the core indicated generally at 170 is of E-shaped configuration and a collector winding 172 is wound on the center leg of the core 170. A pair of feedback windings 174 and 176 are wound on the outer legs of the core 170 and are connected in series opposition from ground through the condenser 38 to the base electrode of the transistor 34. The temperature compensation arrangement including the resistors 40 and 42 is retained in the embodiment of FIG. 7 and the upper end of the collector winding 172 is connected to the collector of the transistor 34 and the bottom end of this winding to the resistor 36. The remaining circuitry of FIG. 7 is similar to that of FIG. 1 so that a negative signal is provided at the terminal 64 during periods when the transistor 34 is oscillating.

In the arrangement of FIG. 7 the movement which is to be digitized is that of an input shaft 180 and this shaft carries an assembly which comprises a center disc 182 and a pair of outer discs 184 and 186 all of which are fixed to and rotatable with the shaft 180. Between these discs there is provided a pair of annular permanent magnets 188 and 190 each of which is polarized transversely in the manner indicated in FIG. 7. Thus, the magnet 188 is magnetized so that the face adjacent the center disc 182 is a south pole and the face adjacent the outer disc 186 is a north pole. In a similar manner the magnet 190 is magnetized so that the face adjacent the center disc 182 is a south pole and the face adjacent the outer disc 184 is a north pole. The periphery of the center disc 182 is smooth and is arranged to move in close proximity to the center leg of the core 170 as the shaft 180 rotates. The outer disc 184 is provided with a notched periphery defining a plurality of teeth 184*a* the ends of which are arranged to move past the end of the right hand outer leg of the core 170 as the shaft 180 is rotated. In a similar manner the outer disc 186 is provided with notches defining a plurality of teeth 186*a* the ends of which are arranged to move past the ends of the left end outer leg of the core 170 as the shaft 180 is rotated. However, the teeth 186*a* of the disc 186 are staggered with respect to the teeth 184*a* of the outer disc 184 so that the teeth of these discs are alternately and successively moved into proximity with the respective outer legs of the core 170. Thus, when the shaft 180 is in the position shown in FIG. 7 one of the teeth 184*a* is positioned adjacent the right hand leg of the core 170 whereas when the shaft 180 is positioned as shown in FIG. 7A one of the teeth 186*a* of the disc 186 is positioned adjacent the other leg of the core 170. It is to be noted that the assembly thus described may be economically manufactured since the discs 182, 184 and 186 may be stamped members and the magnets 188 and 190 are simple, annular members which can be readily formed and need not be held to close tolerances.

The above described arrangement is such that when the shaft 180 is rotated an external magnetic field is first presented between the center leg and one outer leg of the core 170 which is oriented so as to cause the transistor 34 to osicllate and then an external magnetic field is presented between the center leg and the other outer leg of the core 120 which is oriented so as to hold the transistor 34 off. The windings on the core 170 are arranged so that flow of leakage current through the collector winding 172 produces a flux which flows downward in both of the outer legs of the core 170. When the shaft 180 is in the position shown in FIG. 7 the external magnetic field is defined by the center disc 182, the magnet 190 and the outer disc 184. The south pole of this field is defined by the adjacent peripheral portion of the disc 182, which is adjacent the center leg of the core 170 and the north pole of this field is defined by one of the teeth 184*a* of the disc 184 which is adjacent the right hand outer leg of the core 170. The flux from this external magnetic field flows upwardly in the right hand outer leg and tends to oppose the flux due to the collector winding 172 so that the feedback winding 174 does not tend to saturate. Also, in the magnetic circuit which includes the center leg and right hand leg of the core 170 there are only the small air gaps between the periphery of the disc 182 and the center leg and between the end of the tooth 184*a* and the right hand leg. This means that the coupling between the collector winding 172 and the feedback winding 174 is good when the shaft 180 is in the position shown in FIG. 7. When the shaft 180 is in this position the left hand leg of the core 170 is opposite one of the notches in the disc 186 so that a large air gap is included in the magnetic circuit which includes the collector winding 172 and the feedback winding 176. This means that the coupling between the windings 172 and 176 is poor. The net result of these factors is that the feedback coil 174 predominates and since this coil provides negative feedback the oscillator 34 is prevented from oscillating when the shaft 180 is in the position shown in FIG. 7.

When the shaft is moved to the position shown in FIG. 7A, an external magnetic field is moved into proximity with the center leg and the left hand outer leg of the core 170, while, at the same time, a notch in the disc 184 is positioned adjacent the right hand leg of this core. Under these conditions the magnet 188 causes the periphery of the center disc 182 to act as a south pole adjacent the center leg of the core 170 and one of the teeth 186*a* of the disc 186 provides a north pole adjacent the left hand leg of this core. This external magnetic field produces a flux which is upward in the left hand outer leg and hence opposes the downward flux produced in this leg by the flow of leakage current in the collector winding 172. Furthermore, the magnetic circuit which includes the windings 172 and 176 includes only the small air gaps between the disc 182 and the center leg and between the tooth 186*a* and the left hand outer leg. On the other hand, the notch in the disc 184 provides a large air gap in the magnetic circuit which includes the collector winding 172 and the feedback winding 174. This means that the coupling between the collector winding 172 and the feedback winding 176 is good while the coupling between the collector winding 172 and the feedback winding 174 is poor. Furthermore, since the flux of the external magnetic field tends to oppose the collector flux in the winding 176, this winding has no tendency to saturate and hence predominates over the feedback winding 174. The feedback winding 176 provides positive feedback which is sufficient to cause the transistor 34 to oscillate in the manner described in detail heretofore in connection with the action of the positive feedback winding 14 (FIG. 1) in causing the transistor 34 to oscillate.

It will thus be seen that as the shaft 180 is rotated, the oscillator is successively caused to oscillate as the successive magnetic fields defined by the teeth 186*a* of the disc 186 are moved past the left hand leg of the core 170. On the other hand, when the teeth 184*a* of the disc 184 are moved into proximity with the right hand leg of the core 170 the transistor 34 is positively prevented from oscillating. This insures that oscillations will be produced in successive increments digitally representing movement of the input shaft 180. In this connection it will be understood that while a rotary movement has been illustrated in FIG. 7, the principles of the present invention may also be employed in connection with linear movement, in which case a flat member or rack having teeth similar to the teeth 184*a* and 186*a* and polarized in the same manner would be moved past the core 170 to provide the same type of output signal as in FIG. 7. It will also be understood that the arrangement of FIG. 7 provides only one output signal which changes value in accordance with the spacing of the teeth 184*a* and 186*a* and hence represents movement of the shaft 180. If it is desired to provide a plural digit output signal which represents in binary rotation successive incremental positions of the shaft 180 a number of assemblies may be positioned on the shaft 180 and a core structure and associated circuit provided for each assembly, the spacing and width of the teeth on successive assemblies being twice as great as the previous assembly. With such an arrangement the outputs of the respective circuits will represent different digits of a plural digit binary number corresponding to different physical positions of the shaft 180, as will be readily understood by those skilled in the art. Other arrangements of assemblies and tooth size and spacing may obviously be employed to provide other types of composite output signals representing the position of the shaft 180 in other numerical code systems.

It will be noted that the arrangement of FIG. 7 is such that the transistor 34 is alternately caused to oscillate and prevented from oscillating by the successive fields defined by the teeth 186*a* and 184*a*. This insures that the output signal at the terminal 64 represents fixed increments of movement of the shaft 180. A simplified arrangement may be employed in which a U-shaped core structure is employed instead of the core 170 with only one toothed disc and the central disc 182 to define successive magnetic fields of the same polarity as the shaft 180 is rotated. For example, the structure of FIG. 1 may be employed substituting the disc 186, magnet 188 and disc 182 for the drum 24. In this arrangement the teeth 186*a* of the disc 186 would move past the pole tip 20 and the periphery of the disc 182 would move past the pole tip 19. The teeth of the disc 186 would define successive magnetic fields in a manner similar to successive magnetic bits 28 in FIG. 1 and each tooth would cause the transistor 34 to oscillate so that a digital output signal would be provided at the terminal 64 which represents movement of the shaft 180. However, in this alternative arrangement there would be some fringe field effects present when the pole tip 20 is opposite one of the notches between the teeth 186*a* and this fringe field would also tend to cause the transistor to oscillate. Accordingly, an unsymmetrical flux distribution in the core 10, such as described in detail heretofore in connection with FIG. 5, is preferred to prevent this fringe field from causing the transistor 34 to oscillate. Also, the thickness of the core 10 may be made considerably smaller than the width of the teeth 186*a* to further reduce this field fringing effect so that oscillations are produced only in response to the fields defined by the teeth 186*a*.

In the embodiment of FIG. 1, the external magnetic field is provided by the magnetic bit 28 which is brought up to the ends of the pole tip portions 19 and 20 for the sensing operation. While this arrangement is satisfactory, a somewhat more sensitive arrangement can be provided by forming the magnetic bits as raised teeth which can pass through the center of the air gap 18 between the pole tip portions 19, 20. Such an arrangement is shown in FIG. 8 wherein the magnetic bits are defined by small, individually magnetizable teeth 200 which are raised from the surface of the drum 201 and are arranged to be moved into the air gap 18 as the drum 201 is rotated. The teeth 200 are preferably formed of magnetic material having high retentivity and may be polarized by any suitable means so that they produce a magnetic flux in the core 10 when the tooth is moved into the air gap 18. Thus, the tooth 204 is illustrated as polarized in the correct polarity to cause the transistor 34 to oscillate whereas the tooth 206 is of the opposite polarity and would prevent this transistor from oscillating. With the arrangement of FIG. 8 there is less loss of flux from the external magnetic field and hence the sensitivity of the magnetic sensing device is increased. Of course, the dimensions of the teeth 200 must be commensurate with the air gap 18 and clearance requirements to the core 10. The teeth 200 may, for example, be of square cross section of approximately .02 inch on a side.

Figure 9:
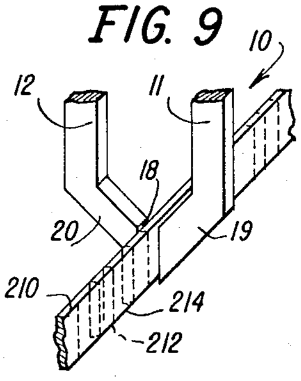
FIG. 9 is a fragmentary perspective view of another embodiment of the invention in which successive magnetic fields are contained in a movable magnetic tape.
Figure 10:
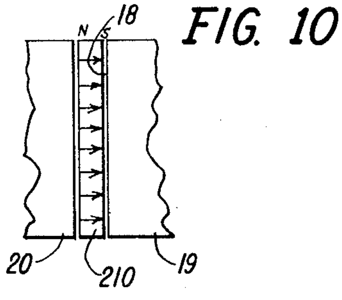
FIG. 10 is a fragmentary front view, partly in section, of the device of FIG. 9.

In FIGS. 9 and 10 there is disclosed a further alternative embodiment in which the series of external magnetic fields are defined by appropriately magnetized portions of a magnetic tape 210. This magnetic tape is arranged to be moved by suitable mechanical means (not shown) so that it passes through the air gap 18 between the pole tip portions 19 and 20 of the core 10. Thus, the tape is provided with a series of magnetized areas indicated at 212 and 214 and in these areas the magnetization may be of either polarity so as to cause a flow of magnetic flux in either direction through the core 10. For example, in FIG. 10 a magnetized area is shown within the air gap 18 which is equivalent to the magnetic bit 28 of FIG. 1 and hence causes the transistor 34 to oscillate. It will be understood that a magnetized area of the opposite polarity would prevent this transistor from oscillating in the same manner as the magnetic bit 29. The use of a magnetic tape carrier in the embodiment of FIGS. 9 and 10 permits extremely close coupling between the external magnetic field and the core 10 so that extremely low level magnetic fields may be sensed and employed to control oscillation of the transistor 34, as described in detail heretofore in connection with the embodiment of FIG. 1. For example, if the magnetic tape 210 has a thickness of one mil then the air gap 18 may be only slightly larger so that close coupling of the external magnetic field appearing on this tape with the core 10 may be established.

While particular embodiments of the invention have been illustrated and described it will be understood that many changes and modifications will readily occur to those skilled in this art and it is, therefore, contemplated by the appended claims to cover any such changes and modifications as fall within the true spirit and scope of the invention.

What is claimed as new and desired to be secured by Letters Patent of the United States is:

1. A polarity sensitive device for sensing low magnitude magnetic fields of predetermined polarity, comprising magnetic core means including a pair of symmetrically positioned core elements, a feedback winding on each of said core elements, an electron control device having a control electrode and an output electrode, means connecting said feedback windings in series opposition to said control electrode, means for coupling energy from the output electrode circuit of said control device to said feedback windings, means for establishing oppositely directed magnetic fluxes linking said feedback windings so that the series combination of said feedback windings is balanced and is ineffective to produce sustained oscillations, means defining an external magnetic field of predetermined orientation, means for positioning said field defining means in flux linking relation to said core elements to unbalance said series combination of said feedback windings in a direction dependent upon the orientation of said magnetic field, and means responsive to unbalance of said series combination in the positive feedback direction for producing sustained oscillations.

2. A polarity sensitive device for sensing low level magnetic fields, comprising a magnetic-coupled oscillator including core means having a pair of symmetrically positioned core elements and a feedback winding on each of said core elements, means connecting said feedback windings in series opposition so that said oscillator is normally prevented from oscillating, means defining a magnetic field producing element of predetermined orientation and polarity, and means for positioning said element in flux linking relationship to said core elements, thereby to aid one of said feedback windings and oppose the other of said feedback windings so that said oscillator is permitted to oscillate when a predetermined one of said feedback windings is aided.

3. A polarity sensitive device for sensing low level magnetic fields, comprising a magnetic-coupled oscillator including core means having a pair of symmetrically positioned core elements and a feedback winding on each of said core elements, means connecting said feedback windings in series opposition so that said oscillator is normally prevented from oscillating, means defining a magnetic field producing element of predetermined orientation and polarity, and means for positioning said element in flux linking relationship to said core elements so that flux due to said magnetic field producing element flows through said core elements in a direction dependent upon the orientation of said element to aid one of said feedback windings and oppose the other of said feedback windings, and means responsive to aiding of a predetermined one of said feedback windings by said magnetic field producing element for causing said oscillator to oscillate.

4. A device for sensing a low level magnetic field of predetermined polarity, comprising a pair of square hysteresis loop core elements, a pair of windings on each of said core elements, means positioning said core elements to define a pair of symmetrically positioned air gaps, one of said gaps being substantially smaller than the other, a transistor, means connecting one winding on each of said core elements in series aiding relation to the collector of said transistor, means connecting the other winding on each core element in series opposition to the base-emitter circuit of said transistor, means normally biasing said transistor to a point at which said transistor is almost ready to oscillate, means defining a magnetic field of variable orientation, and means for positioning said magnetic field defining means in the vicinity of said larger air gap, thereby to establish a flow of magnetic flux through said core elements in a direction which aids one of said base-emitter windings and opposes the other of said base-emitter windings so that said transistor oscillates only in response to a predetermined polarization of said magnetic field.

5. A polarity sensitive device for sensing low level magnetic fields of predetermined polarity, comprising a magnetic-coupled oscillator including magnetic core means, means normally establishing a predetermined flux pattern in said core means such that said magnetic-coupled oscillator is prevented from oscillating, means defining a series of discrete magnetic fields of predetermined orientation and polarity, and means for producing relative movement between said core means and said series of magnetic fields so that said magnetic fields successively link said core means, whereby magnetic fields of one polarity cause said oscillator to oscillate while fields of the opposite polarity do not.

6. A polarity sensitive device for sensing low level magnetic fields of predetermined polarity, comprising first and second elongated magnetic core elements, said elements being joined together at one end thereof through a relatively small air gap and being separated at the other end thereby by a relatively large air gap, a magnetic coupled oscillator including windings on said first and second core elements which are interconnected in such manner that said oscillator is normally prevented from oscillating, means defining a discrete magnetic field producing element of predetermined orientation and polarity, means for positioning said element in flux linking relation to said large air gap, thereby to change the flux densities in said core elements in such manner as to permit said oscillator to oscillate when said magnetic field producing element has a predetermined polarization.

7. A polarity sensitive device for sensing low level magnetic fields of predetermined polarity, comprising first and second elongated magnetic core elements, said elements being joined together at one end thereof through a relatively small air gap and being separated at the other end thereof by a relatively large air gap, first and second windings on said first and second core elements, a magnetic-coupled oscillator having a feedback path which includes said first and second windings, said windings being connected in series opposition in said feedback path so that said oscillator is normally prevented from oscillating, means for positioning an external magnetic field adjacent said large air gap so as to change the flux distribution through said first and second windings, said change in flux distribution being effective to cause said oscillator to oscillate only in response to a predetermined polarity of said magnetic field.

8. A polarity sensitive device for sensing low level magnetic fields of predetermined polarity, comprising first and second elongated magnetic core elements, said elements being joined together at one end thereof through a relatively small air gap, and being separated at the other end thereof by a relatively large air gap, first and second windings on said first and second core elements, a magnetic-coupled oscillator having a feedback path which includes said first and second windings, said windings being connected in series opposition in said feedback path and being symmetrically balanced so that said oscillator is normally prevented from oscillating, means for positioning an external magnetic field adjacent said large air gap so as to unbalance the flux distribution through said first and second windings, said unbalance in flux distribution being effective to cause said oscillator to oscillate only in response to a predetermined polarity of said magnetic field.

9. Magnetic field sensing means including a pair of symmetrically positioned core elements and a winding on each of said core elements, an oscillator circuit, said windings being connected in said oscillator circuit in such manner as to prevent said oscillator from oscillating, means defining a series of discrete magnetic fields, means for producing relative movement between said core elements and said field defining means so that said fields successively link said core elements, whereby magnetic fields of one polarity cause said oscillator to produce an output signal while fields of the opposite polarity do not, a flip-flop circuit including a pair of stages, means normally biasing said flip-flop circuit so that one of said stages is normally conductive, means responsive to conduction of said one stage for biasing said core elements so that said oscillator does not oscillate in response to fields of either polarity, pulse gating means for rendering both said stages non-conductive for a predetermined interval, whereby said oscillator is caused to oscillate in response to linking fields of said one polarity, and means responsive to said oscillator output signal for causing the other one of said stages to conduct, whereby said flip-flop circuit is set to a predetermined condition only during periods when application of a gate pulse coincides with a linking magnetic field of said one polarity.

10. A magnetic field responsive memory device, comprising a magnetic-coupled oscillator circuit including magnetic core means, means defining a series of discrete magnetic fields, means for producing relative movement between said core means and said field defining means so that said fields successively link said core means, means for establishing a first predetermined flux pattern in said core means whereby linking of magnetic fields of one polarity with said core means causes said oscillator to oscillate and magnetic fields of the opposite polarity do not, and means responsive to oscillation of said oscillator for establishing a second flux pattern in said core means which causes said oscillator to continue oscillating irrespective of the presence or absence of a linking magnetic field.

11. A magnetic field responsive memory device, comprising a magnetic-coupled oscillator circuit including magnetic core means, means defining a series of discrete magnetic fields, means for producing relative movement between said core means and said field defining means so that said fields successively link said core means, means for establishing a first predetermined flux pattern in said core means during a predetermined gating interval whereby linking of magnetic fields of one polarity with said core means during said gating interval causes said oscillator to oscillate and magnetic fields of the opposite polarity do not, and means responsive to oscillation of said oscillator for establishing a second flux pattern in said core means which causes said oscillator to continue oscillating irrespective of the presence or absence of a linking magnetic field, thereby to provide an indication of the polarity of the magnetic field linking said core means during said gating interval.

12. A magnetic field responsive memory device, comprising a magnetic-coupled oscillator circuit including magnetic core means, means defining a series of discrete magnetic fields, means for producing relative movement between said core means and said field defining means so that said fields successively link said core means, means for establishing a first predetermined flux pattern in said core means whereby linking of magnetic fields of one polarity with said core means causes said oscillator to oscillate and magnetic fields of the opposite polarity do not, a flip-flop circuit settable to one of two conditions, means responsive to the setting of said flip-flop circuit to one of said conditions for establishing a second flux pattern in said core means which causes said oscillator to oscillate in the absence of any linking magnetic field, means responsive to the setting of said flip-flop circuit to the other of said conditions for establishing a third flux pattern in said core means which prevents said oscillator from oscillating in response to a linking magnetic field of either polarity, means normally setting said flip-flop to said other condition, and means responsive to oscillation of said oscillator in response to a linking field of said one polarity for setting said flip-flop circuit to said one condition.

13. A magnetic field responsive memory device, comprising a magnetic-coupled oscillator circuit including magnetic core means, means defining a series of discrete magnetic fields, means for producing relative movement between said core means and said field defining means so that said fields successively link said core means, means for establishing a first predetermined flux pattern in said core means during a predetermined gating interval whereby linking of magnetic fields of one polarity with said core means during said gating interval causes said oscillator to oscillate and magnetic fields of the opposite polarity do not, a flip-flop circuit settable to one of two conditions, means responsive to the setting of said flip-flop circuit to one of said conditions for establishing a second flux pattern in said core means which causes said oscillator to oscillate in the absence of a linking magnetic field, means responsive to the setting of said flip-flop circuit to the other of said conditions for establishing a third flux pattern in said core means which prevents said oscillator from oscillating in response to a linking magnetic field of either polarity, means for setting said flip-flop to said other conditions during periods between said gating intervals, and means responsive to oscillation of said oscillator during one of said gating intervals for setting said flip-flop circuit to said one condition until the next gating interval.

14. A digital encoding device, comprising core means of E-shaped configuration, a winding on the center leg of said core means, a feedback winding on each outer leg of said core means, a transistor, means connecting said center leg winding in the collector circuit of said transistor, means connecting said feedback windings on said core means in series to a control electrode of said transistor in such relation to said center leg winding as to be normally ineffective to produce sustained oscillation in said transistor, a member movement of which is to be encoded, means defining a first series of discrete magnetic fields polarized in one direction and a second series of discrete magnetic fields polarized in the opposite direction, means responsive to movement of said member for alternately and successively positioning magnetic fields from said first and second series between the center leg and outer legs of said core means, thereby alternately to change the normal flux pattern established in said core means in the direction to cause said transistor to oscillate, and means for deriving an output signal from said transistor representing movement of said member.

15. A digital encoding device, comprising core means of E-shaped configuration, a winding on the center leg of said core means, a feedback winding on each outer leg of said core means, a transistor, means connecting said center leg winding in the collector circuit of said transistor, means connecting said feedback windings on said core means in series to a control electrode of said transistor in such relation to said center leg winding as to be normally ineffective to produce sustained oscillation in said transistor, first and second toothed members positioned so that the teeth thereof alternately move past the outer legs of said E core means, an intermediate member positioned adjacent the center leg of said E core means, means for magnetizing said toothed members relative to said intermediate member, means for moving said toothed members and said intermediate member as a unit in accordance with the movement to be encoded so that the flux pattern in said core means is repeatedly changed in accordance with said movement, and means for deriving an output signal from said transistor representative of the movement to be encoded.

16. A digital encoding device, comprising core means of E-shaped configuration, a winding on the center leg of said core means, a feedback winding on each outer leg of said core means, an electron control device having an output electrode and a control electrode, means connecting said center leg winding in the output electrode circuit of said control device, means connecting said feedback windings in the control electrode circuit of said control device in such relation that said control device is ineffective to produce sustained oscillations in the absence of an external magnetic field of predetermined polarity adjacent said core means, a shaft movement of which is to be encoded, a pair of toothed wheel elements positioned on said shaft adjacent the outer leg portions of said core means, the teeth of one of said elements being offset relative to the teeth of the other of said elements, an intermediate wheel element of uniform periphery positioned on said shaft adjacent the center leg portion of said core means, permanent magnet means positioned between said toothed wheel elements and said intermediate wheel element to polarize the teeth of said pair of elements relative to said intermediate wheel element, whereby the flux pattern set up in said core means is changed in one direction when a tooth of one of said elements is adjacent one outer leg of said core means and is changed in the opposite direction when a tooth of the other of said elements is adjacent the other outer leg of said core means, and means for causing said control device to oscillate during periods when the teeth of one of said elements are adjacent the corresponding outer leg portion of said core means.

17. A digital encoding device, comprising core means of E-shaped configuration, a magnetic-coupled oscillator having a feedback path which includes first and second windings on said core means, said first and second windings being connected in series opposition in said feedback path so that said oscillator is normally prevented from oscillating, a member having means defining first and second series of discrete magnetic field producing elements, means for producing relative movement between said E-core means and said member so that magnetic fields from said first series of elements are positioned adjacent the center leg and one outer leg of said E-core means and in alternate succession magnetic fields from said second series of elements are positioned adjacent the center leg and the other outer leg of said E-core means, thereby to cause said oscillator to oscillate during periods corresponding to the magnetic fields of one of said first and second series, and means for deriving an output signal from said oscillator representing said relative movement.

18. A digital encoding device, comprising core means of E-shaped configuration, a magnetic-coupled oscillator having a feedback path which includes first and second windings on said core means, said first and second windings being connected in series opposition in said feedback path so that said oscillator is normally prevented from oscillating, a rotatable assembly comprising a center disc, a pair of permanent magnets positioned on either side of said center disc and a pair of outer discs positioned on the other sides of said permanent magnets, said center disc being aligned with its periphery adjacent the center leg of said E core means and said outer discs being aligned with their peripheries adjacent the outer legs of said E core means, said outer discs having a toothed periphery so as to define first and second series of discrete magnetic fields, the teeth of said outer discs being offset so that said first and second series of magnetic fields are alternately moved into adjacency with said E core as said assembly is rotated, whereby said oscillator is caused to oscillate during periods when one of said series of magnetic fields is adjacent said E core means, and means for deriving a signal from said oscillator representing movement of said assembly.

References Cited by the Examiner

UNITED STATES PATENTS

| | | | |
|---|---|---|---|
| 2,875,429 | 2/1959 | Quade | 340—174 |
| 2,938,198 | 5/1960 | Berman et al. | 340—347 |
| 2,991,460 | 7/1961 | Hill | 340—347 |
| 3,041,598 | 6/1962 | Betts | 340—347 |
| 3,171,104 | 2/1965 | Norton et al. | 340—174.1 |

MAYNARD R. WILBUR, *Primary Examiner.*

DARYL W. COOK, *Examiner.*

A. L. NEWMAN, *Assistant Examiner.*